(12) United States Patent
Tekeli et al.

(10) Patent No.: US 12,546,680 B2
(45) Date of Patent: Feb. 10, 2026

(54) METHOD FOR OPTICALLY INSPECTING AN OPHTHALMIC LENS TO DETERMINE AN ORIENTATION STATE AND AN INVERSION STATE OF AN OPHTHALMIC LENS

(71) Applicant: Alcon Inc., Fribourg (CH)

(72) Inventors: Niyazi Tekeli, Eschau (DE); Susanne Fechner, Aschaffenburg (DE)

(73) Assignee: Alcon Inc., Fribourg (CH)

( * ) Notice: Subject to any disclaimer, the term of this patent is extended or adjusted under 35 U.S.C. 154(b) by 308 days.

(21) Appl. No.: 18/188,529

(22) Filed: Mar. 23, 2023

(65) Prior Publication Data
US 2023/0304890 A1 Sep. 28, 2023

Related U.S. Application Data

(60) Provisional application No. 63/269,980, filed on Mar. 27, 2022.

(51) Int. Cl.
G01M 11/02 (2006.01)

(52) U.S. Cl.
CPC .............................. *G01M 11/0221* (2013.01)

(58) Field of Classification Search
CPC ............. G01M 11/0221; G01M 11/02; G01M 11/0207; G01M 11/0242
See application file for complete search history.

(56) References Cited

U.S. PATENT DOCUMENTS

| | | | |
|---|---|---|---|
| 5,280,336 A * | 1/1994 | Fantone | G01M 11/025 356/124 |
| 5,812,254 A * | 9/1998 | Ebel | G01M 11/0207 356/124 |
| 7,433,027 B2 * | 10/2008 | Hall | G01M 11/0207 356/613 |
| 7,973,915 B2 * | 7/2011 | Lassig | B65B 35/58 198/380 |
| 7,990,531 B2 * | 8/2011 | Clements | G01N 21/958 356/124 |
| 9,253,448 B1 * | 2/2016 | Wang | G01N 21/8803 |
| 10,591,747 B2 * | 3/2020 | Paulekuhn | G01N 21/958 |
| 11,221,499 B2 * | 1/2022 | Jubin | G02C 7/049 |

(Continued)

FOREIGN PATENT DOCUMENTS

| | | | | |
|---|---|---|---|---|
| CN | 104545790 B | * | 4/2016 | ............... A61B 3/14 |
| CN | 115639687 B | * | 4/2024 | |

(Continued)

*Primary Examiner* — Mohamed K Amara
(74) *Attorney, Agent, or Firm* — Sheng-Hsin Hu (57) ABSTRACT

A method for optically inspecting an ophthalmic lens in an automated lens production process to determine an orientation state and an inversion state of the ophthalmic lens. The method comprises the steps of acquiring an image of the ophthalmic lens, determining from the acquired image an orientation value of the lens, comparing the determined orientation value with an orientation threshold value, and determining that the lens is oriented right side up when the determined orientation value is higher than the orientation threshold value, or determining that the lens is oriented upside down when the determined orientation value is lower than the orientation threshold value, or vice versa.

7 Claims, 5 Drawing Sheets

(56) References Cited

U.S. PATENT DOCUMENTS

| | | | |
|---|---|---|---|
| 2012/0133958 A1* | 5/2012 | Widman | G01M 11/0207 |
| | | | 356/632 |
| 2014/0092395 A1* | 4/2014 | Fechner | G01M 11/0235 |
| | | | 356/124 |
| 2017/0027437 A1* | 2/2017 | Neal | A61B 3/18 |
| 2018/0120199 A1 | 5/2018 | Unterkofler et al. | |
| 2019/0072784 A1 | 3/2019 | Paulekuhn et al. | |
| 2024/0156538 A1* | 5/2024 | Roh | A61B 34/10 |

FOREIGN PATENT DOCUMENTS

| | | | | |
|---|---|---|---|---|
| ES | 2397518 T3 * | 3/2013 | | G02C 7/04 |
| WO | WO-2009006361 A1 * | 1/2009 | | B65B 57/10 |
| WO | 2015036432 A1 | 3/2015 | | |
| WO | WO-2020079206 A1 * | 4/2020 | | G01B 11/06 |
| WO | WO-2023001756 A1 * | 1/2023 | | B29D 11/0048 |

\* cited by examiner

METHOD FOR OPTICALLY INSPECTING AN OPHTHALMIC LENS TO DETERMINE AN ORIENTATION STATE AND AN INVERSION STATE OF AN OPHTHALMIC LENS

FIELD OF THE INVENTION

The present invention generally relates to the field of automated production of ophthalmic lenses, in particular contact lenses such as soft contact lenses. More specifically, it is related to a method for optically inspecting such an ophthalmic lens to determine an orientation state and an inversion state of the ophthalmic lens, and to an ophthalmic lens inspection system configured to perform the method.

BACKGROUND OF THE INVENTION

Contact lenses from a wide range of materials are nowadays produced in great volumes in automated lens production processes. To ensure top quality of the produced contact lenses, the final contact lenses are optically inspected prior to packaging. Because contact lenses are intended for use on the eye, great care must be taken to make sure that the contact lenses meet strict quality standards. In such an automated production process of contact lenses, the produced contact lenses are typically transferred to an optical inspection module to determine whether they meet the strict quality standards.

Such an optical inspection module typically comprises a lens carrier (e.g. a cuvette) having a concave surface for the contact lens to rest on, with the contact lens being normally oriented right side up, such that a convex front surface of the contact lens faces the concave surface of the lens carrier. However, for some reasons it may occur that the contact lens is oriented upside down such that the concave rear surface of the contact lens faces the concave surface of the lens carrier. For a contact lens that is oriented upside down it may be difficult to reliably determine whether the contact lens meets the quality standards during the optical inspection. Also, the handling of the contact lenses with the aid of grippers may be more difficult in case the contact lenses are oriented upside down.

Furthermore, it may occur that a (soft) contact lens is inverted such that the—normally concavely shaped—rear surface of the contact lens protrudes convexly outwardly while the front surface of the lens is inverted to a concave shape. And although the wearer may generally determine whether a contact lens is actually inverted when taking the contact lens out of the package, for the sake of user-friendliness it is preferred and may even be required that inverted contact lenses be detected and re-inverted prior to inspection and packaging of the contact lens.

Methods for determining the orientation state or the inversion state of a contact lens are known in the art. For example, US 2019/0072784 suggests a method for determining whether the contact lens is oriented right side up or upside down on the lens carrier. The determination of the orientation state is made based on a measurement of the amount of defocus of a central portion of an image of the contact lens. The measured amount of defocus is compared with a predetermined threshold, and based on the result of this comparison with the threshold it is determined whether the contact lens is oriented right side up or upside down. In case the contact lens is determined to be oriented upside down, the contact lens may be turned to be oriented right side up prior to performing the optical inspection.

Methods for determining the inversion state of a (soft) contact lens are also known in the art. For example, WO 2015/036432 suggests a method for determining whether the contact lens is inverted based on detected line structures of a coloring pigment contained in the contact lens. Such coloring pigment may be a very decent coloring pigment (e.g. rendering the contact lens a little bluish) that may help the user locate the contact lens in the package. Determination of the inversion state is made based on the fact that the coloring pigments are somewhat stretched when the lens is inverted so as to have a line structure. The number of line structures (i.e. stretched coloring pigments) in a predetermined section of an image of the contact lens is then counted and compared with a threshold. Based on the result of this comparison with the threshold it is determined whether the contact lens is inverted or non-inverted. In case the contact lens is determined to be inverted, re-inversion of the contact lens may be performed prior to performing the optical inspection the contact lens.

The threshold for the determination of the orientation state as well as the threshold for determination of the inversion state remains unchanged (fixed) in the automated ophthalmic lens manufacturing process during a production run. Typically, prior to the start of a production run these thresholds are set and remain unchanged at least until the production run is interrupted again (which may take at least several hours or even days, so that very large numbers of contact lenses are produced while the thresholds remain unchanged). For example, prior to the start of a production run the thresholds may be set to threshold values based on experiences from previous production runs.

However, common variations in the production process such as changes in temperature, raw material batches or lens design may lead to changes in the appearance of the contact lens in the images of the contact lens. The said changes in the appearance may lead to wrong determinations of the orientation and/or the inversion state of the contact lens, and may ultimately lead to a decrease of the production yield, as correctly oriented or non-inverted contact lenses may wrongly get re-oriented or re-inverted, respectively, and may subsequently be determined as not meeting the specifications during the optical inspection. Also, even in case a wrongly inverted contact lens is determined as meeting the specifications, the inverted contact lens may then be placed in the primary package in the inverted state which is unwanted as it may create customer dissatisfaction.

It is therefore an object of the invention to overcome the afore-mentioned disadvantages.

SUMMARY OF THE INVENTION

In accordance with the present invention, these and other objects are met by a method for optically inspecting an ophthalmic lens, in particular a contact lens such as a soft contact lens, in an automated lens production process, to determine an orientation state and an inversion state of the ophthalmic lens, and by an ophthalmic lens inspection system configured to perform the method, as specified by the features of the independent claims. Advantageous aspects of the method and the ophthalmic lens inspection system according to the invention are the subject of the dependent claims.

As used in the specification including the appended claims, the singular forms "a", "an", and "the" include the plural, unless the context explicitly dictates otherwise. When using the term "about" with reference to a particular numerical value or a range of values, this is to be understood in the sense that the particular numerical value referred to in connection with the "about" is included and explicitly disclosed, unless the context clearly dictates otherwise. For example, if a range of "about" numerical value A to "about" numerical value B is disclosed, this is to be understood to include and explicitly disclose a range of numerical value A to numerical value B. Also, whenever features are combined with the term "or", the term "or" is to be understood to also include "and" unless it is evident from the specification that the term "or" must be understood as being exclusive.

According to the invention, a method for optically inspecting an ophthalmic lens, in particular a contact lens such as a soft contact lens, in an automated lens production process, to determine an orientation state and an inversion state of the ophthalmic lens is suggested. The method comprises the steps of acquiring an image of the ophthalmic lens, determining from the acquired image an orientation value of the ophthalmic lens, comparing the determined orientation value with an orientation threshold value, and determining that the ophthalmic lens is oriented right side up when the determined orientation value is higher than the orientation threshold value, or determining that the ophthalmic lens is oriented upside down when the determined orientation value is lower than the orientation threshold value, or vice versa.

The method further comprises the steps of:

determining from the acquired image an inversion value of the ophthalmic lens, comparing the determined inversion value of the optically inspected ophthalmic lens with an inversion threshold value and determining that the lens is non-inverted when the determined inversion value is higher than the inversion threshold value, or determining that the ophthalmic lens is inverted when the determined inversion value is lower than the inversion threshold value, or vice versa.

At least one of the orientation threshold value and the inversion threshold value is determined based on a distribution of orientation values and a distribution of inversion values of previous optically inspected ophthalmic lenses, respectively.

The at least one of the orientation threshold value and the inversion threshold value is dynamically adapted during the automated lens production process.

According to one aspect of the method according to the invention, both the orientation threshold value and the inversion threshold value are determined based on the distribution of orientation values and the distribution of inversion values of previous optically inspected ophthalmic lenses, respectively, and both the inversion threshold value and the orientation threshold value are dynamically adapted during the automated lens production process.

According to another aspect of the method according to the invention, determining the orientation state of the ophthalmic lens is performed prior to determining the inversion state of the ophthalmic lens.

According to a further aspect of the method according to the invention, the ophthalmic lens is an ophthalmic lens containing coloring pigments. Determining the orientation value is performed by determining the degree of defocus of a central portion of the image of the ophthalmic lens. For the ophthalmic lens determined to be oriented right side up the inversion value is then determined by calculating a deformation image noise level related to a deformation state of the coloring pigments of a section of the image of the ophthalmic lens, whereas for the ophthalmic lens determined to be oriented upside down the inversion value is then determined by determining a width of a dark edge zone in the image of the ophthalmic lens.

According to yet another aspect of the method according to the invention, determining the degree of defocus of the central portion of the image of the ophthalmic lens containing the coloring pigments comprises calculating a defocus image noise level related to an amount of blur of the central portion of the image.

According to a further aspect of the method according to the invention, the dynamically adapted orientation threshold value and the dynamically adapted inversion threshold value are determined during the automated production process based on a distribution of orientation values and a distribution of inversion values, respectively, of a predetermined number of the most recent previous optically inspected ophthalmic lenses.

According to yet a further aspect of the method according to the invention, the predetermined number of the most recent previous optically inspected ophthalmic lenses is in a range of 100 to 10000, in particular in a range of 1000 to 3000.

According to another aspect of the method according to the invention, the distribution of orientation values of the most recent previous optically inspected ophthalmic lenses comprises a lower range of orientation values of the most recent previous optically inspected ophthalmic lenses oriented upside down, and a higher range of orientation values of the most recent previous optically inspected ophthalmic lenses oriented right side up.

The dynamically adapted orientation threshold value is determined to be an arithmetic mean value of a highest value of the lower range of orientation values and a lowest value of the higher range of orientation values.

For the ophthalmic lenses oriented upside down, the distribution of inversion values comprises a distribution of values of the width of the dark edge zone in the images of the ophthalmic lenses comprising a lower range of values of the width of the dark edge zone in the images of the inverted ophthalmic lenses, and a higher range of values of the width of the dark edge zone in the images of the non-inverted ophthalmic lenses, wherein the dynamically adapted inversion threshold value is determined to be an arithmetic mean value of a highest value of the lower range of values and a lowest value of the higher range of values of the width of the dark edge zone.

For the ophthalmic lenses oriented right side up, the distribution of inversion values comprises a distribution of deformation image noise level values comprising a lower range of deformation image noise level values of the inverted ophthalmic lenses, and a higher range of deformation image noise level values of the non-inverted ophthalmic lenses, wherein the dynamically adapted inversion threshold value is determined to be an arithmetic mean value of a highest value of the lower range of deformation image noise level values and a lowest value of the higher range of deformation image noise level values.

According to the invention, an ophthalmic lens inspection system configured to perform the method according to the invention is suggested, too. The system comprises:

an imaging unit for acquiring an image of the ophthalmic lens, a processor configured to perform the steps of:
- determining the orientation value from the image of the ophthalmic lens acquired by the imaging unit,
- comparing the determined orientation value with the orientation threshold value,
- determining that the ophthalmic lens is oriented right side up, or determining that the ophthalmic lens is oriented upside down,
- determining the inversion value from the image of the ophthalmic lens acquired by the imaging unit,
- comparing the determined inversion value with the inversion threshold value,
- determining that the ophthalmic lens is non-inverted, or determining that the ophthalmic lens is inverted, and
- determining the at least one of the orientation threshold value and the inversion threshold value based on the distribution of orientation values and the distribution of inversion values of previous optically inspected ophthalmic lenses, respectively.

The processor is further configured to dynamically adapt the at least one of the inversion threshold value and the orientation threshold value during the automated lens production process.

According to one aspect of the system according to the invention, the imaging unit comprises a camera for acquiring the image of the ophthalmic lens.

For the optical inspection the ophthalmic lens is typically arranged on a transparent surface of a lens carrier, typically a concave surface (such as the concave surface of an inspection cuvette as described above). In this case, the term 'orientation state' of the ophthalmic lens refers to the orientation of the lens with respect to the (concave) surface of the lens carrier. The ophthalmic lens, in particular a contact lens, has a convex front surface and a concave rear surface. In the desired non-inverted state, the non-inverted ophthalmic lens is considered as being oriented right side up when the convex front surface of the lens faces the (concave) surface of the lens carrier. On the other hand, the ophthalmic lens is considered as being oriented upside down when the concave rear surface of the lens faces the (concave) surface of the lens carrier. The inversion state of the lens refers to the lens being either inverted (inside out) or not. The ophthalmic lens, in particular a soft contact lens, is considered inverted when the—normally concavely shaped—rear surface of the lens protrudes convexly outwardly while the front surface of the lens is inverted to have a concave shape. Such an inverted lens is considered as being oriented right side up when it is arranged on the lens carrier such that the convexly protruding rear surface of the lens faces the (concave) surface of the lens carrier, and is considered as being oriented upside down when the (inverted) front surface of the lens having the concave shape faces the (concave) surface of the lens carrier.

Optically inspecting the ophthalmic lens comprises acquiring a (camera) image of the ophthalmic lens. The terms 'orientation value' and 'inversion value' refer to values determined from the optical inspection of the lens, with the respective value being representative of the orientation state or the inversion state. In one embodiment, the orientation value comprises a degree of defocus of a central portion of the image, in particular an image noise level related to an amount of blur of the central portion of the image, and the inversion value comprise a width of a dark edge zone in the image of the ophthalmic lens or an image noise level, as will be explained in more detail below.

Dynamically adapting the at least one of the orientation threshold value and the inversion threshold value during the automated production process allows for an adaptation of the respective threshold value to changes that may occur in the automated lens production process during a production run (i.e. while production is running). In particular, by dynamically adapting the at least one of the orientation threshold value and the inversion threshold value, common production process variations such as changes in temperature, raw material batches or lens design that may lead to changes of the orientation values and inversion values determined from the optical inspection of ophthalmic lenses having the same orientation state and inversion state can be accounted for when determining the threshold value. For example, for the orientation value being high when the lens is oriented right side up and being low when the lens is oriented upside down, dynamically adapting the orientation threshold value is performed such that it is ensured that the orientation value determined from an optically inspected lens being oriented right side up is always higher than the dynamically adapted orientation threshold value, and that the orientation value determined from an optically inspected lens being oriented upside down is always lower than the dynamically adapted orientation threshold value. Or vice versa: For the orientation value being low when the lens is oriented right side up and being high when the lens is oriented upside down, dynamically adapting the orientation threshold value is performed such that it is ensured that the orientation value determined from an optically inspected lens being oriented right side up is always lower than the dynamically adapted orientation threshold value, and that the orientation value determined from an optically inspected lens being oriented upside down is always higher than the dynamically adapted orientation threshold value.

This applies similarly to the inversion value and the inversion threshold value. For example, for the inversion value being high when the lens is non-inverted and being low when the lens is inverted, dynamically adapting the inversion threshold value is performed such that it is ensured that the inversion value determined from an optically inspected lens being non-inverted is always higher than the dynamically adapted orientation threshold value, and that the inversion value determined from an optically inspected lens being inverted is always lower than the dynamically adapted inversion threshold value. Or vice versa: For the inversion value being low when the lens is non-inverted and being high when the lens is inverted, dynamically adapting the inversion threshold value is performed such that it is ensured that the inversion value determined from an optically inspected lens being non-inverted is always lower than the dynamically adapted inversion threshold value, and that the inversion value determined from an optically inspected lens being inverted is always higher than the dynamically adapted inversion threshold value.

Thus, it can be ensured that even in case common production process variations (e.g. changes in temperature, raw material batches, lens design) occur during the running automated lens production process the comparison of the determined orientation value and the determined inversion value with the respective dynamically adapted threshold value leads to a correct decision as to whether the lens is oriented right side up or upside down as well as to a correct decision as to whether or not a lens is inverted. The amount of wrong decisions based on a sub-optimal threshold value is thus either eliminated or at least greatly reduced, thus increasing the production yield (as lenses which are within the specifications if they were oriented right side up and non-inverted may not be wrongly sorted out due to their orientation value and inversion value being compared with a sub-optimal orientation threshold value or a sub-optimal inversion threshold value). Also, an unnecessary re-orientation or re-inversion of a lens prior to the lens being subjected to a cosmetic inspection for scratches, flaws, bubbles, inclusions, tears or the like may be dispensed with, thus rendering the inspection module less complicated and cheaper.

Distributions of orientation values and inversion values of previous optically inspected ophthalmic lenses are indicative of ranges in which the orientation values and inversion values of ophthalmic lenses having the respective orientation state and inversion state accumulate. Thus, such distributions may provide an empirical basis for the determination of the respective threshold values. Accordingly, in a preferred embodiment, dynamically adapting the orientation threshold value and/or the inversion threshold value can be performed based on the distribution of the respective orientation values and inversion values of the most recent optically inspected ophthalmic lenses to ensure a prompt adaptation of the respective threshold value to said production process variations.

It is advantageous to determine both, the orientation state and the inversion state of the ophthalmic lens, in particular as the manner how the inversion state of the ophthalmic lens is determined may depend on the determined orientation state. Accordingly, determining both the orientation threshold value and the inversion threshold value based on the distribution of orientation values and the distribution of inversion values of previous optically inspected ophthalmic lenses and dynamically adapting both threshold values has the advantage that both threshold values may be adapted to the afore-mentioned process variations that may occur during production. These process variations may affect not only one of the orientation value and the inversion value, but may affect both of them at the same time. Thus, dynamically adapting both the orientation threshold value and the inversion threshold value makes the method for determining the orientation state and the inversion state of the ophthalmic lens even more reliable and robust.

Typically, simultaneously determining the inversion state and the orientation state of an ophthalmic lens may turn out to be rather difficult as the inversion state may have an influence on the orientation value used for the determination of the orientation state, and the orientation state may have an influence on the inversion value used for the determination of the inversion state. Accordingly, in one embodiment of the method according to the invention the orientation state of the lens is determined prior to determining the inversion state of the lens. This determination of the orientation state prior to determining the inversion state is advantageous as depending on the result of the determination of the orientation state (lens is oriented right side up or lens is oriented upside down) may trigger the manner how the inversion state of the lens is determined, as will be explained in more detail below.

In one embodiment of the method according to the invention in which the ophthalmic lens contains coloring pigments (e.g. for rendering the lens a little 'bluish' to help the user find the lens in the storage solution upon opening the package), these coloring pigments may be coloring pigments as described in WO 2015/036432 and US 2019/007284. These coloring pigments may be used to determine the degree of defocus contained in a central portion of the image of the ophthalmic lens. The coloring pigments form a structural pattern that appears sharp in an image of the ophthalmic lens with a low amount of defocus when the structural pattern is within the depth of field of the camera used for acquiring the image. For example, when the ophthalmic lens is oriented right side up the central portion of the ophthalmic lens may be within the depth of field of the camera, and consequently the structural pattern in the central portion of the image appears sharp, whereas when the lens is oriented upside down the central portion of the ophthalmic lens is outside the depth of field, and consequently the structural pattern in the central portion of the image appears blurred. The coloring pigments can also be used to determine the inversion state of the ophthalmic lens. In case the ophthalmic lens is inverted, the coloring pigments are getting deformed and stretched to a line structure. When the coloring pigments are stretched, the coloring pigments appear less intense in color and thus the deformation image noise level of the image is reduced. Accordingly, determining the deformation image noise level of a section of the image indicates the deformation state of the optical pigment, and thus is indicative of the inversion state (lens inverted or non-inverted). A preferred measure for the deformation image noise level indicating the appearance of such line structures is a standard deviation of a grey scale value noise of a said section of the image of the ophthalmic lens. The section of the image does not need to comprise the entire ophthalmic lens, it is sufficient when the section is large enough to comprise some of the line structures. Alternatively, the line structures can also be detected and counted as described in WO 2015/036432. However, the afore-described options to determine the inversion state of the ophthalmic lens with the aid of the coloring pigments can be performed easier and in a straightforward manner in case the ophthalmic lens is oriented right side up, such that the coloring pigments are within the depth of field of the camera. Thus, it is advantageous to determine the inversion state by calculating the deformation image noise related to a deformation state of the coloring pigments for a lens that is determined to be oriented right side up, whereas a different method may be used when the lens is determined to be oriented upside down. In the latter case, according to a preferred embodiment of the method according to the invention, the inversion value is determined by determining a width of a dark edge zone in the image of the ophthalmic lens. In this regard, when the ophthalmic lens is inverted, the width of a dark edge zone (i.e. a dark zone in the image of the lens extending radially inwardly from the lens edge) in the (bright-field) image of a non-inverted lens is considerably larger than the width of the dark edge zone in the image of an inverted lens. Without being bound by any theory, tt is believed that the width of this dark edge zone results from the thickness of the lens in a zone close to the lens edge, and this thickness is considerably smaller for an inverted lens than for a non-inverted lens. The afore-described width of the dark edge zone is therefore indicative of the inversion state of the lens.

In one embodiment of the method according to the invention in which the lens contains coloring pigments, the amount of defocus can be determined from the amount of blur contained in the central portion of the image. The amount of blur allows for the calculation of a defocus image noise level related to the amount of blur as described in US 2019/0072784. An appropriate measure for the defocus image noise level is a standard deviation of a grey scale value noise of a central portion of the image of the ophthalmic lens. When the ophthalmic lens is oriented right side up, the coloring pigments, in particular the structural pattern formed by the coloring pigments, appear sharp with a very low degree of blur and there is a high variation of the grey scale values, leading to a higher standard deviation of the grey scale value noise. In contrast thereto, when the ophthalmic lens is oriented upside down and the structural pattern formed by the coloring pigments appears blurred and the variation of the grey scale values is smeared, this leads to a lower standard deviation of the grey scale value noise.

Using a distribution of orientation values and a distribution of inversion values of a predetermined number of the most recent previous optically inspected ophthalmic lenses may be advantageous in that it allows to dynamically adapt the orientation threshold value and the inversion threshold value reliably and sufficiently fast to any process variations, in order to be able to make accurate determinations of the orientation state and the inversion state of the lens. For example, the predetermined number of the most previous optically inspected ophthalmic lenses may be in the range of 100 to 10000, in particular in the range of 1000 to 3000. A number selected from these ranges enables the determination of the orientation threshold value and the inversion threshold value in a reliable manner. For example, an update of the orientation threshold value and/or the inversion threshold value may be performed each time the next 10 or 100 lenses have been inspected.

As mentioned above, the manner how the inversion state of the ophthalmic lens is determined may depend on the already determined orientation state of the ophthalmic lens. Accordingly, the dynamically adapted inversion threshold value may be determined differently for ophthalmic lenses oriented right side up and for ophthalmic lenses oriented upside down. As mentioned above, the inversion threshold value may be determined for ophthalmic lenses oriented right side up based on a distribution of deformation image noise level values. Accordingly, the distribution of deformation image noise level values considered for determining the inversion threshold value contains only deformation image noise level values from those most recent previous optically inspected ophthalmic lenses determined to be oriented right side up (i.e. deformation values from previous optically inspected ophthalmic lenses oriented right side up, regardless of their inversion state). For lenses being oriented upside down, the inversion threshold value may be determined based on a distribution of the values of the width of the dark edge zone. In such instance, the distribution of values of the width of the dark edge zone considered for determining the inversion threshold value contains only values of the width of the dark edge zone from those most recent previous optically inspected ophthalmic lenses determined to be oriented upside down (i.e. values of the width of the dark edge zone from previous optically inspected lenses oriented upside down, regardless of their inversion state).

Each distribution of orientation values and inversion values comprises an upper range of values and a lower range of values. By determining the respective threshold as the arithmetic mean of the highest value of the lower range and the lowest value of the upper range the threshold value is midway between the ranges. Since the respective lower range and the higher range normally do not overlap, it is avoided that the respective threshold falls within any of the respective higher or lower ranges, as this would lead to wrongly determined orientation and inversion states.

The advantages of the inspection system according to the invention correspond to those of the method according to the invention and are therefore not repeated.

BRIEF DESCRIPTION OF THE DRAWINGS

Further advantageous aspects of the invention become apparent from the following description of embodiments of the invention with the aid of the (schematic) drawings, in which.

Figure 1:
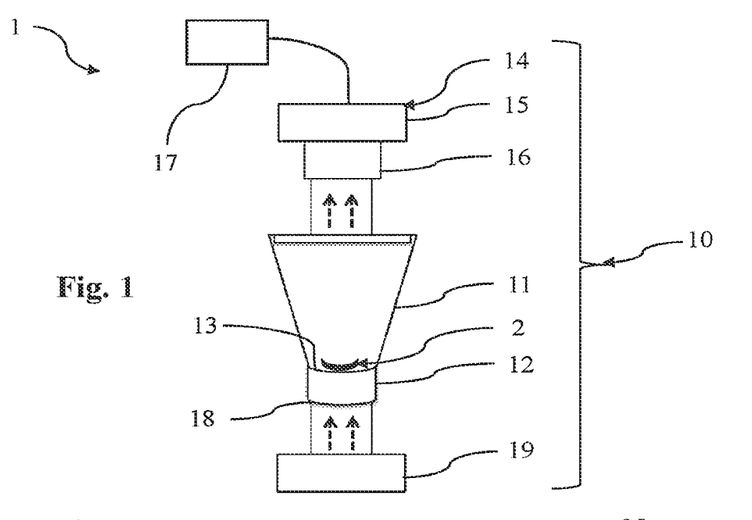
FIG. 1 shows components of an embodiment of the ophthalmic lens inspection system according to the invention.

FIG. 1 shows schematically an embodiment of components of an ophthalmic lens inspection system 1 according to the invention, in particular an imaging unit 10. In FIG. 1, a container 11 accommodating a soft contact lens 2 to be optically inspected is arranged in the imaging unit 10. The container 11 is completely filled with a liquid such as water or saline, in which the soft contact lens 2 is immersed. The container 11 comprises a container bottom 12 having a concave upper container bottom surface 13 for the soft contact lens 2 to rest on. The container bottom 12 is made of a transparent material such as quartz glass, and the concave upper container bottom surface 13 as well as a lower container bottom surface 18 of the container bottom 12 are polished to optical quality. The lower container bottom surface 18 is convexly shaped such that the container bottom 12 has light focusing properties. The imaging unit 1 comprises a light source 19 and a camera 14. Light is irradiated from the light source 19 through the container bottom 12 and the soft contact lens 2 resting on the concave upper container bottom surface 13 allowing the camera 14 to acquire an image of the soft contact lens 2. The camera 14 comprises an objective 16 for focusing the light transmitted through the container bottom 12 and the soft contact lens 2 onto a light sensor 15 such as a CCD-sensor or a CMOS-sensor. The objective 16 may comprise a telecentric objective. The imaging unit 10 may comprise further optical elements such as focusing elements and mirrors which are not shown in the drawing.

The image of the soft contact lens 2 is then further processed by a processor 17 of the ophthalmic lens inspection system. The processor 17 is configured to perform the necessary computational steps to determine an orientation state of the soft contact lens 2 from the acquired image, and to determine an inversion state of the soft contact lens 2 either from the acquired image, as is described in more detail further below.

Figure 2:
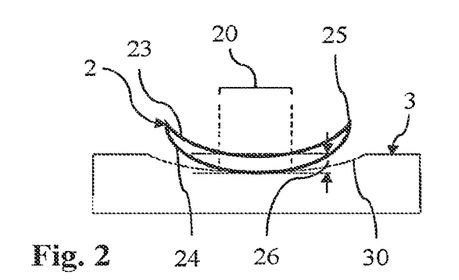
FIG. 2 shows a non-inverted soft contact lens oriented right side up and arranged on a lens holder.

FIG. 2 shows the soft contact lens 2 arranged on a lens holder 3. The lens holder 3 may be formed by the container bottom 12 shown in FIG. 1, however, due to the shape of the lens holder 3 shown in FIG. 2 deviating from the entirely concave shape of the container bottom 12 shown in FIG. 1 it has been assigned a different reference sign in FIG. 2. The lens holder 3 has a concave surface 30 for the soft contact lens 2 to rest on for the optical inspection. For the avoidance of doubt, this optical inspection of the soft contact lens 2 is performed for the purpose of determining the orientation of the soft contact lens 2 and the inversion state of the soft contact lens, and has nothing to do with the inspection of the soft contact lens 2 for cosmetic defects such as scratches, inclusions, bubbles, tears or edge defects which is performed only once the soft contact lens 2 is oriented right side up and is non-inverted. The soft contact lens 2 comprises a convexly shaped front surface 24 and a concavely shaped rear surface 23 which is in contact with the eye of the wearer when the soft contact lens 2 is worn. The soft contact lens 2 shown in FIG. 2 is oriented right side up, such that the convexly shaped front surface 24 of the soft contact lens 2 faces the concave surface 30 of the lens holder 3. In this case a central portion 20 of the soft contact lens 2 is within a depth of field 26 of the camera 14. Only portions of the soft contact lens which are within the depth of field 26 appear focused in an image of the contact lens 2. The depth of field 26 may extend horizontally as shown in FIG. 2, but it may in an alternative embodiment also extend as a curved shape following the shape of the concave surface 30 of the lens holder 3. The soft contact lens 2 shown in FIG. 2 is non-inverted.

Figure 3:
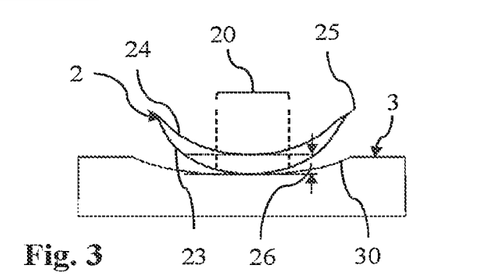
FIG. 3 shows an inverted soft contact lens oriented right side up and arranged on the lens holder.

FIG. 3 shows the soft contact lens 2 arranged on the lens holder 3, however, with the soft contact lens 2 being inverted (i.e. in a different inversion state than in FIG. 2). The soft contact lens 2 is again oriented right side up, such that a convex surface of the inverted soft contact lens 2 faces the concave surface 30 of the lens holder 3. However, due to the soft contact lens 2 being inverted the convex surface of the soft contact lens 2 facing the concave surface 30 of the lens holder 3 is the rear surface 23 of the soft contact lens 2 which is normally concavely shaped. The central portion 20 of the soft contact lens 2 in this inversion state and orientation state (i.e. oriented right side up and inverted) is again within the depth of field 26 of the camera 14.

Figure 4:
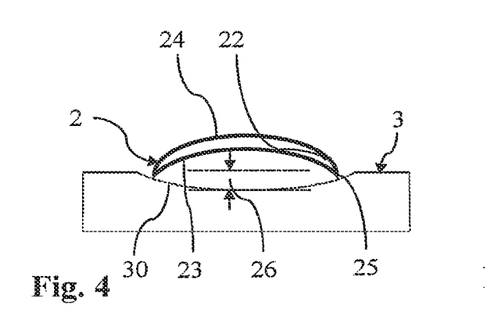
FIG. 4 shows a non-inverted soft contact lens oriented upside down and arranged on the lens holder.

FIG. 4 shows the soft contact lens 2 arranged on the lens holder 3, however with the soft contact lens 2 being oriented upside down. The soft contact lens 2 shown in FIG. 3 is non-inverted. In this orientation and inversion state, the rear surface 23 of the soft contact lens 2 is concavely shaped and the front surface 24 is convexly shaped, as desired. However, due to the contact lens 2 being oriented upside down the concavely shaped rear surface 23 faces the concave surface 30 of the lens holder 3. In this orientation state and inversion state, the central portion 20 of the soft contact lens 2 is outside the depth of field 26 of the camera 14.

Figure 5:
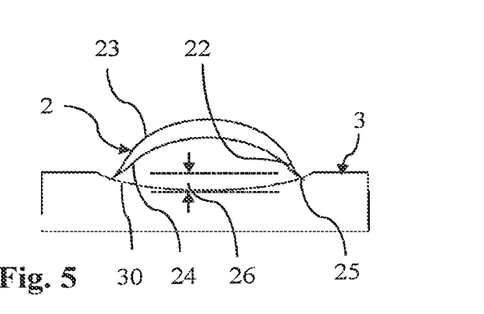
FIG. 5 shows an inverted soft contact lens oriented upside down and arranged on the lens holder.

FIG. 5 shows the soft contact lens 2 arranged on the lens holder 3, however with the soft contact lens 2 being oriented upside down. The soft contact lens shown in FIG. 4 is inverted. In this state, the front surface 24—which in this state is concavely shaped-faces the concave surface 30 of the lens holder 3. Also, in this state of the soft contact lens 2, the central portion of the soft contact lens 2 is outside the depth of field 26 of the camera 14.

Figure 6:
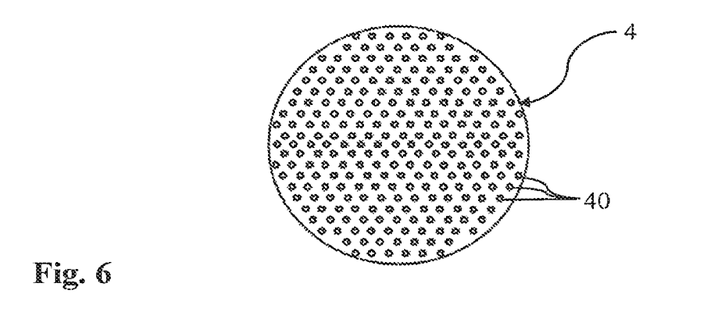
FIG. 6 shows a focused image of a central portion of a non-inverted soft contact lens oriented right side up.

FIG. 6 shows a focused central portion 4 of an image of the non-inverted soft contact lens 2 oriented right side up (state of the soft contact lens 2 shown in FIG. 2). The focused central portion 4 of the image contains a plurality of sharply imaged coloring pigments 40 (only three of them being labelled with reference sign 40 in FIG. 6). The coloring pigments are contained in a structural pattern in the soft contact lens 2 such as described in US 2019/0072784 or WO 2015/036432. As the central portion 20 of the soft contact lens 2 is arranged within the depth of field 26 of the camera 14, features of the central portion 20 of the contact lens 2 are in focus in the image. Thus, the imaged coloring pigments 40 appear unblurred (i.e. with a low degree of defocus).

Figure 7:
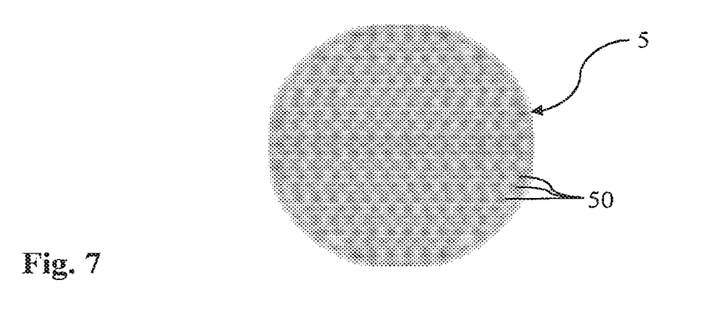
FIG. 7 shows a defocused image of a central portion of a non-inverted soft contact lens oriented upside down.

FIG. 7 shows a defocused central portion 5 of an image of the non-inverted soft contact lens 2 oriented upside down (state of the soft contact lens 2 shown in FIG. 4). The defocused central portion 5 contains a plurality of blurredly imaged coloring pigments 50 (again only three of them being labelled with reference sign 50 in FIG. 7), whereas the coloring pigments contained in the soft contact lens 2 are the same as the ones visible as sharply imaged coloring pigments 40 in the focused central portion 4 of the image of the soft contact lens 2 oriented right side up (see FIG. 6). However, in contrast to FIG. 6, the central portion 20 of the soft contact lens 2 is arranged outside the depth of field 26 of the camera 14 (see FIG. 4). Thus, features of the central portion 20 of the soft contact lens 2, such as the blurredly imaged coloring pigments 50 are not in focus in the image. Thus, the imaged coloring pigments 50 appear blurred (i.e. with a high degree of defocus) in the defocused central portion 5 of the image.

As can be seen from FIG. 6 and FIG. 7, the degree of defocus of the central portion 4, 5 of the image may well be used to determine the orientation state of the soft contact lens 2 (i.e. right side up or upside down).

Figure 10:
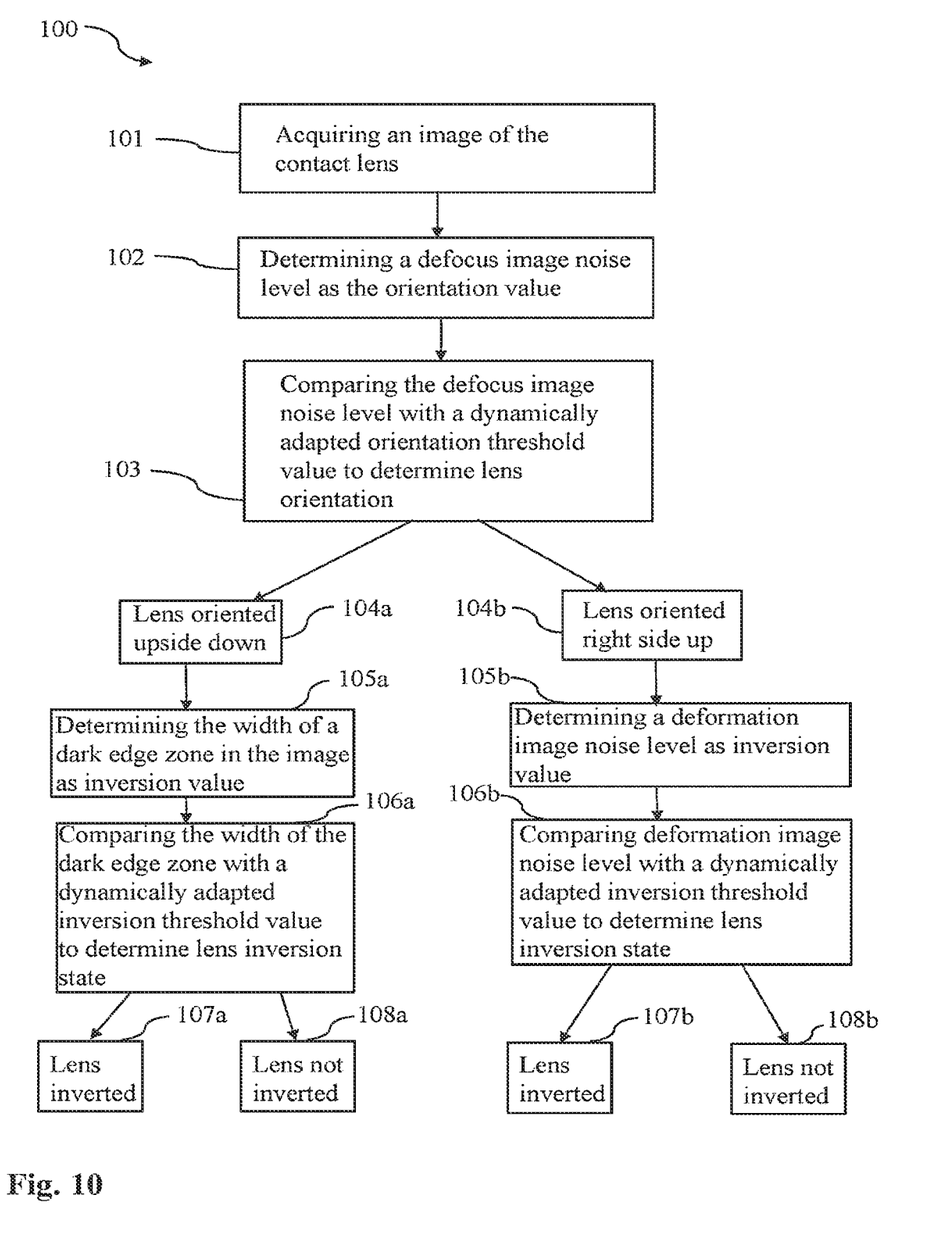
FIG. 10 shows a flowchart of an embodiment of the method according to the invention.

FIG. 10 shows a flowchart illustrating an embodiment of the method 100 according to the invention to determine both the orientation state and the inversion state of a soft contact lens 2. In step 101, an image of the soft contact lens 2 is acquired. As already discussed above in connection with FIG. 6-FIG. 8, the image of the soft contact lens 2 may be a telecentric bright field image acquired by the camera 14. In step 102, a defocus image noise level is then determined from a central portion of the image as described in US 2019/0072784, this defocus image noise level representing the orientation value. As can be seen from FIG. 6 and FIG. 7, the grey scale values of the focused central portion 4 of the image (see FIG. 6) have a stronger variation compared to the grey scale values of the defocused central portion 5 of the image (see FIG. 7). The defocus image noise level can therefore be determined as the standard deviation of the grey scale values of the respective central portion 4, 5 of the image of the soft contact lens 2. Filters may be applied to the images for the determination of the standard deviation of the grey scale values. Such filters may comprise a Wiener filter or a Fourier transform, as described in US 2019/0072784. Moreover, an edge detection filter may be applied prior to the calculation of the said standard deviation. The so obtained value for the standard deviation is then used as the orientation value and is compared with a dynamically adapted orientation threshold value in step 103. The soft contact lens 2 is determined to be oriented right side up when the orientation value is higher than the dynamically adapted orientation threshold value, and is determined to be oriented upside down when the orientation value is lower than the dynamically adapted orientation threshold value.

Thus, the soft contact lens 2 is determined as either being oriented upside down, as illustrated by step 104a, or it is determined as being oriented right side up, as illustrated by step 104b. Steps 102, 103, 104a, 104b of the method are performed by the processor 17 (FIG. 1).

The manner how the inversion state of the soft contact lens 2 is determined depends on the orientation state of the contact lens that is already determined as described above (lens oriented right side up or upside down).

Figure 8:
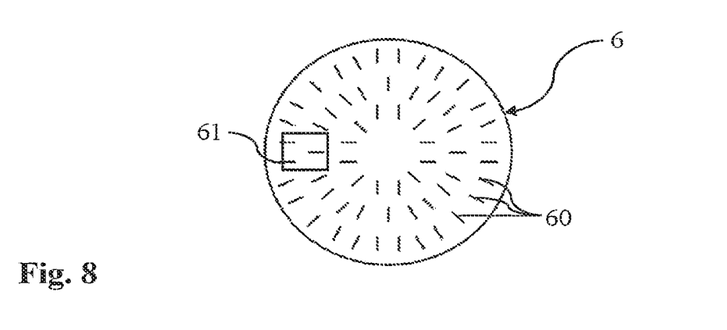
FIG. 8 shows a focused image of a section of an inverted soft contact lens oriented right side up.

For the soft contact lens 2 determined to be oriented right side up (step 104b), the inversion state can be determined with the aid of the coloring pigments contained in the soft contact lens 2 which are contained as imaged coloring pigments in the image of the soft contact lens 2. FIG. 8 shows a focused central portion 6 of an image of an inverted soft contact lens 2 oriented right side up. Due to the soft contact lens 2 being oriented right side up, the central portion 20 of the soft contact lens 2 is within the depth of field 26 of the camera 14. However, in an alternative embodiment the portion of the soft contact lens 2 that is in focus may be a portion other than the central portion 20, as long as the said portion is within the depth of field 26 of the camera 14. As described in WO 2015/036432, the coloring pigments contained in the inverted soft contact lens 2 are deformed to line structures. The central portion 6 of the image comprises a plurality of imaged deformed coloring pigments 60. Thus, the inversion state of the soft contact lens 2 can be determined with the aid of the imaged deformed coloring pigments 60 contained in the image. When the coloring pigments are getting deformed, the variation of grey scale values of the imaged pigments 60 contained in the focused central portion 6 of the image is reduced (due to the pigments being stretched). A deformation image noise level can then be determined in a manner similar to that described for the non-inverted soft contact lens 2, this deformation image noise level forming the inversion value representing the inversion state of the soft contact lens 2. That is, determining the deformation image noise level in step 105b (FIG. 10) is performed by determining a standard deviation of the grey scale values of a section 61 of the image (FIG. 8). This deformation image noise level is compared with a dynamically adapted inversion threshold value, as illustrated by step 106b (FIG. 10). In case the deformation image noise level is higher than the dynamically adapted inversion threshold value the soft contact lens 2 is determined to be non-inverted, as illustrated by step 108b, and in case the deformation image noise level is lower than the inversion threshold value the contact lens 2 is determined to be inverted, as illustrated by step 107b. In alternative embodiment, the presence of the imaged deformed coloring pigments 60 can be determined by detecting and counting the imaged deformed coloring pigments 60 in section 61 as described in prior art WO 2015/036432.

Figure 9:
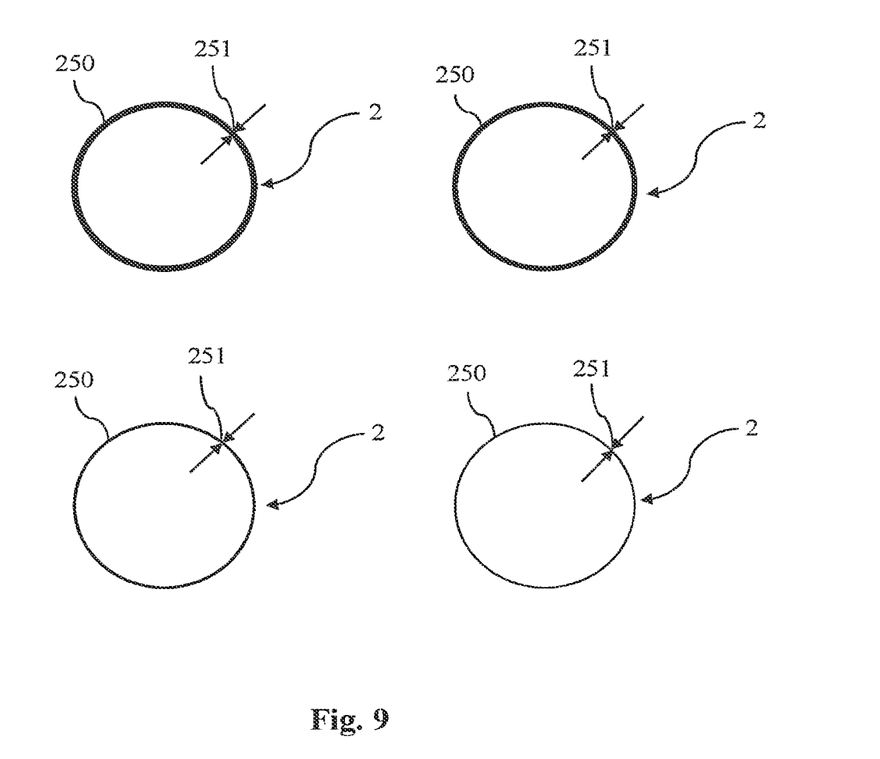
FIG. 9 shows images of four soft contact lenses having different orientation and inversion states.

For the soft contact lens 2 determined to be oriented upside down (step 104a), the inversion state of the soft contact lens 2 is determined from the width 250 of a dark edge zone 251 in the image of the soft contact lens 2. FIG. 9 schematically shows images of four soft contact lens 2 in four different orientation and inversion states:
- the soft contact lens 2 is oriented upside down and is non-inverted (upper left image)
- the soft contact lens 2 is oriented right side up and is non-inverted (upper right image)
- the soft contact lens 2 is oriented upside down and is inverted (lower left image)
- the soft contact lens 2 is oriented right side up and is inverted (lower right image).

As can be seen, when the soft contact lens 2 is in a non-inverted state (upper right and upper left images) the width 251 of a dark edge zone 250 extending radially inwardly from the outermost boundary or edge 25 in the image of the soft contact lens 2 is substantially larger than the width 251 of the dark edge zone 250 in the image of the soft contact lens 2 when the lens is in an inverted state (lower left and lower right images). Accordingly, the width 251 of the dark edge zone 250 can be used to determine the inversion state of the soft contact lens, i.e. to determine whether or not the soft contact lens 2 is inverted. The determined width 251 of the dark edge zone 250 is then compared with a dynamically adapted inversion threshold value, as is illustrated by step 105a (FIG. 10), this width 251 of the dark edge zone 250 forming the inversion value representing the inversion state of the soft contact lens. This width 251 of the dark edge zone 250 is then comparted with a dynamically adapted inversion threshold value, as illustrated by step 106a. In case the determined width 251 is larger than the dynamically adapted threshold value, the soft contact lens 2 is determined to be non-inverted, as illustrated by step 108a, and in case the width 251 is lower than the dynamically adapted inversion threshold value, the soft contact lens 2 is determined to be inverted, as illustrated by step 107a. Steps 105a, 105b, 106a, 106b, 107a, 107b, as well as steps 108a and 108b of the method are again performed by the processor 17 (FIG. 1).

Figure 11:
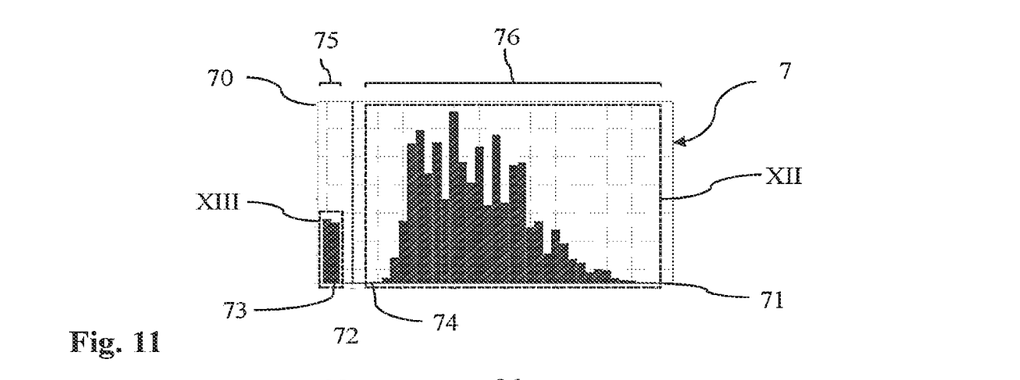
FIG. 11 shows a histogram of a distribution of orientation values of the most recent ones of previous optically inspected soft contact lenses.

The dynamically adapted orientation threshold value may be determined from a distribution of orientation values of the most recent optically inspected soft contact lenses 2, in particular of the values of the defocus image noise level of the said lenses. The orientation values of a number in the range of 100 to 10000, in particular in the range of 1000 to 3000, of the most recent ones of the previous optically inspected contact lenses may be considered when determining the dynamically adapted orientation threshold value (an update of the histograms may be performed periodically, e.g. after every ten or every hundred soft contact lenses 2 have been inspected). A histogram 7 of such a distribution of orientation values of the most recent ones of the previous optically inspected soft contact lenses 2 is shown in FIG. 11. The horizontal axis 71 (abscissa) is the axis of the orientation values, with the defocus image noise levels increasing from left to right. The vertical axis 70 (ordinate) is the axis of the frequency of the values having the respective defocus image noise level. The orientation values accumulate in a lower range 75 of orientation values and a higher range 76 of orientation values. The orientation threshold value 72 is determined as an arithmetic mean of the highest orientation value 73 of the lower range 75 of orientation values and the lowest orientation value 74 of the higher range 76 of orientation values.

Figure 12:
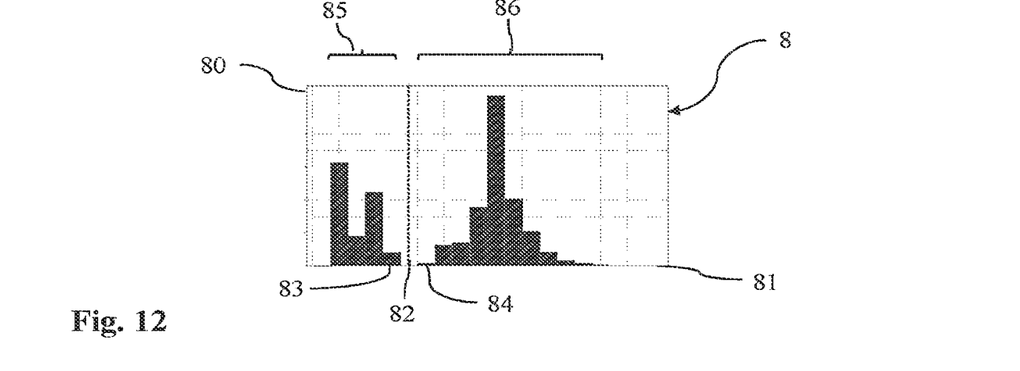
FIG. 12 shows a histogram of a distribution of deformation image noise values of the most recent ones of previous optically inspected soft contact lenses oriented right side up.

To determine the dynamically adapted inversion threshold value for the soft contact lenses 2 oriented right side up, a distribution of the values of the deformation image noise level of the most recent ones of the previous optically inspected soft contact lenses 2 oriented right side up is considered. These previous optically inspected soft contact lenses 2 oriented right side up are highlighted by the rectangle XII in FIG. 11. A histogram 8 of the said distribution is shown in FIG. 12. The distribution of the deformation image noise level values again comprises a lower range 85 of deformation image noise level values and a higher range 86 of deformation image noise level values. The inversion threshold value for the soft contact lenses 2 oriented right side up is then determined as an arithmetic mean value of the highest deformation image noise value 83 of the lower range 85 of deformation image noise level values and the lowest deformation image noise value 84 of the higher range 86 of deformation image noise level values.

Figure 13:
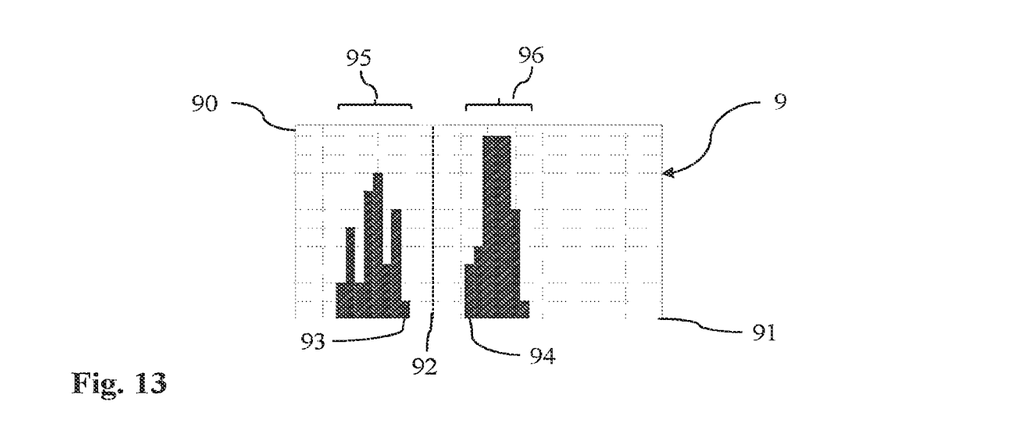
FIG. 13 shows a histogram of a distribution of values of the width of a dark edge zone in the images of the most recent ones of previous optically inspected soft contact lenses oriented upside down.

To determine the dynamically adapted inversion threshold value for the soft contact lenses oriented upside down, a distribution of values of the edge thickness of the most recent ones of the previous optically inspected soft contact lenses 2 oriented upside down is considered. These previous optically inspected soft contact lenses 2 oriented upside down are highlighted by the rectangle XIII in FIG. 11. A histogram 9 of the said distribution is shown in FIG. 13. The distribution of edge thickness values comprises a lower range 95 of edge thickness values and a higher range 96 of edge thickness values. The inversion threshold value for the soft contact lenses 2 oriented upside down is then determined as an arithmetic mean value of the highest edge thickness value 93 of the lower range 95 of edge thickness values and the lowest edge thickness value 94 of the higher range 96 of edge thickness values.

It is evident, that the afore-described orientation threshold value and inversion threshold value may be dynamically adapted during the automated lens production process from the data of the most recent ones of the previous optically inspected soft contact lenses 2. Common production process variations such as changes in temperature, raw material batches or lens design, that may lead to changes of the orientation values and inversion values determined from the optical inspection of soft contact lenses 2 having the same orientation state and inversion state, can be accounted for through the dynamic adaptation of the orientation threshold value and the inversion threshold value. Thus, the determination of the orientation state of the soft contact lenses 2 (right side up or upside down) as well as the determination of the inversion state of the soft contact lenses 2 (inverted or non-inverted) can be made more reliably during the running production even when common production variations occur, thus increasing the production yield.

While embodiments of the invention have been described with the aid of the drawings, the invention is not limited to these embodiments, but rather various changes and modifications are possible without departing from the teaching underlying the invention. Therefore, the scope of protection is not intended to be limited to the embodiments described, but rather is defined by the appended claims.

The invention claimed is:

1. Method for optically inspecting an ophthalmic lens in an automated lens production process to determine an orientation state and an inversion state of the ophthalmic lens, the method comprising the steps of acquiring a camera image of the ophthalmic lens, determining from the acquired image an orientation value of the ophthalmic lens, comparing the determined orientation value with an orientation threshold value, and determining that the ophthalmic lens is oriented right side up when the determined orientation value is higher than the orientation threshold value, or determining that the ophthalmic lens is oriented upside down when the determined orientation value is lower than the orientation threshold value, determining from the acquired image an inversion value of the ophthalmic lens, comparing the determined inversion value of the optically inspected ophthalmic lens with an inversion threshold value and determining that the lens is non-inverted when the determined inversion value is higher than the inversion threshold value, or determining that the ophthalmic lens is inverted when the determined inversion value is lower than the inversion threshold value, wherein at least one of the orientation threshold value and the inversion threshold value is determined based on a distribution of orientation values and a distribution of inversion values of previous optically inspected ophthalmic lenses, respectively, wherein the at least one of the orientation threshold value and the inversion threshold value is dynamically adapted during the automated lens production process, wherein both the orientation threshold value and the inversion threshold value are determined based on the distribution of orientation values and the distribution of inversion values of previous optically inspected ophthalmic lenses, respectively, and wherein both the inversion threshold value and the orientation threshold value are dynamically adapted during the automated lens production process, wherein the dynamically adapted orientation threshold value and the dynamically adapted inversion threshold value are determined during the automated production process based on a distribution of orientation values and a distribution of inversion values, respectively, of a predetermined number of the most recent previous optically inspected ophthalmic lenses, wherein the predetermined number of the most recent previous optically inspected ophthalmic lenses is in a range of 100 to 10000.

2. Method according to claim 1, wherein determining the orientation state of the ophthalmic lens is performed prior to determining the inversion state of the ophthalmic lens.

3. Method according to claim 2, wherein the ophthalmic lens is an ophthalmic lens containing coloring pigments, wherein determining the orientation value is performed by determining the degree of defocus of a central portion of the image of the ophthalmic lens, and wherein for the ophthalmic lens determined to be oriented right side up the inversion value is then determined by calculating a deformation image noise level related to a deformation state of the coloring pigments of a section of the image of the ophthalmic lens, whereas for the ophthalmic lens determined to be oriented upside down the inversion value is then determined by determining a width of a dark edge zone in the image of the ophthalmic lens.

4. Method according to claim 3, wherein determining the degree of defocus of the central portion of the image of the ophthalmic lens containing the coloring pigments comprises calculating a defocus image noise level related to an amount of blur of the central portion of the image.

5. Method according to claim 3, wherein the distribution of orientation values of the most recent previous optically inspected ophthalmic lenses comprises a lower range of orientation values of the most recent previous optically inspected ophthalmic lenses oriented upside down, and a higher range of orientation values of the most recent previous optically inspected ophthalmic lenses oriented right side up, wherein the dynamically adapted orientation threshold value is determined to be an arithmetic mean value of a highest value of the lower range of orientation values and a lowest value of the higher range of orientation values, wherein for the ophthalmic lenses oriented upside down, the distribution of inversion values comprises a distribution of values of the width of the dark edge zone in the images of the ophthalmic lenses comprising a lower range of values of the width of the dark edge zone in the images of the inverted ophthalmic lenses, and a higher range of values of the width of the dark edge zone in the images of the non-inverted ophthalmic lenses, wherein the dynamically adapted inversion threshold value is determined to be an arithmetic mean value of a highest value of the lower range of values and a lowest value of the higher range of values of the width of the dark edge zone, whereas for the ophthalmic lenses oriented right side up, the distribution of inversion values comprises a distribution of deformation image noise level values comprising a lower range of deformation image noise level values of the inverted ophthalmic lenses, and a higher range of deformation image noise level values of the non-inverted ophthalmic lenses, and wherein the dynamically adapted inversion threshold value is determined to be an arithmetic mean value of a highest value of the lower range of deformation image noise level values and a lowest value of the higher range of deformation image noise level values.

6. Method according to claim 1, wherein the predetermined number of the most recent previous optically inspected ophthalmic lenses in a range of 1000 to 3000.

7. An ophthalmic lens inspection system configured to perform the method according to claim 1, the system comprising:

a camera for acquiring an image of the ophthalmic lens, a processor configured to perform the steps of:

determining the orientation value from the image of the ophthalmic lens acquired by the imaging unit, comparing the determined orientation value with the orientation threshold value, determining that the ophthalmic lens is oriented right side up, or determining that the ophthalmic lens is oriented upside down, determining the inversion value from the image of the ophthalmic lens acquired by the imaging unit, comparing the determined inversion value with the inversion threshold value, determining that the ophthalmic lens is non-inverted, or determining that the ophthalmic lens is inverted, and determining the at least one of the orientation threshold value and the inversion threshold value based on the distribution of orientation values and the distribution of inversion values of previous optically inspected ophthalmic lenses, respectively, wherein the processor is further configured to dynamically adapt the at least one of the inversion threshold value and the orientation threshold value during the automated lens production process.

* * * * *